United States Patent [19]

Kaneyuki

[11] Patent Number: 4,685,355

[45] Date of Patent: Aug. 11, 1987

[54] ACCESSORY DRIVE DEVICE IN ENGINE

[75] Inventor: Kazutoshi Kaneyuki, Hyogo, Japan

[73] Assignee: Mitsubishi Denki Kabushiki Kaisha, Tokyo, Japan

[21] Appl. No.: 802,748

[22] Filed: Nov. 29, 1985

[30] Foreign Application Priority Data

Nov. 30, 1984 [JP] Japan .................... 59-182909[U]

[51] Int. Cl.⁴ .......................................... F16H 15/50
[52] U.S. Cl. ................................ 74/796; 74/190.5; 74/752 R
[58] Field of Search ............... 74/752 C, 752 R, 796, 74/752 E, 467, 191, 190.5; 137/593; 184/6.12, 65

[56] References Cited

U.S. PATENT DOCUMENTS

| | | | |
|---|---|---|---|
| 294,480 | 3/1884 | Lovelis | 184/65 |
| 1,458,883 | 6/1923 | Hunziker | 184/65 X |
| 2,465,523 | 3/1949 | Franke | 184/65 |
| 3,182,519 | 5/1965 | Grieshaber | 74/191 |
| 3,930,423 | 1/1976 | Craig | 74/732 |
| 4,468,984 | 9/1984 | Castelli et al. | 74/191 X |
| 4,480,493 | 11/1984 | Takahashi | 74/467 |
| 4,564,500 | 1/1986 | Keady | 137/593 X |

FOREIGN PATENT DOCUMENTS

| | | | |
|---|---|---|---|
| 595443 | 4/1960 | Canada | 74/796 |
| 1131960 | 6/1962 | Fed. Rep. of Germany | 74/796 |
| 2825730 | 1/1979 | Fed. Rep. of Germany | 74/191 |
| 45165 | 1/1979 | Japan | 74/191 |
| 5149456 | 11/1980 | Japan | 74/191 |
| 99357 | 1/1982 | Japan | 74/467 |
| 747061 | 3/1982 | Japan | 74/796 |
| 58-86434 | 6/1983 | Japan | . |
| 58-200838 | 11/1983 | Japan | . |
| 59-22345 | 2/1984 | Japan | . |
| 59-86455 | 6/1984 | Japan | . |
| 9151656 | 8/1984 | Japan | 74/796 |

Primary Examiner—Leslie Braun
Assistant Examiner—Joseph M. Rolnicki
Attorney, Agent, or Firm—Bernard, Rothwell & Brown

[57] ABSTRACT

A device which drives accessories such as an alternator or a cooling water pump utilizing output of an automobile engine, includes an input shaft installed to an output shaft of the engine, a continuously variable transmission with differential planetary mechanism of the frictional transmission type installed between the shaft and a pulley connected to the accessories, and a pressure adjusting device for adjusting the pressure of the frictional transmission oil retained in an annular chamber enclosing the continuously variable transmission. The pressure adjusting device is connected in communication with the annular chamber and includes bleed holes for providing a free liquid surface of the frictional transmission oil so that variation in pressure of the frictional transmission oil is absorbed by the vertical movement of the free liquid surface.

5 Claims, 3 Drawing Figures

ACCESSORY DRIVE DEVICE IN ENGINE

BACKGROUND OF THE INVENTION

1. Field of the Invention

The present invention relates to a device for driving various accessories such as an alternator, a cooling water pump or the like, utilizing power of an engine of an automobile or the like.

2. Description of the Prior Art

In an engine of an automobile or the like, accessories such as an alternator, a cooling water pump, an air-conditioning compressor, an oil pump for hydraulic servo steering or the like are belt-driven by a crank pulley installed at an end of a crank shaft. Since the accessory drive is accompanied with large power loss during the high speed running of the engine, in order to avoid it, various methods have been proposed that gear shifting of a crank pulley is performed with respect to the engine rotational speed and the running speed of the accessory is limited.

In FIG. 3 illustrating an accessory drive device having such speed limiting function in the prior art, numeral 1 designates an input shaft directly coupled to a crank shaft of an engine (not shown), numeral 2 an input transmission member on the input shaft, and numeral 3 a cam device for generating pressure interposed between the input shaft 1 and the input transmission member 2. Numeral 4 designates a plurality of planetary cones, each composed of a frictional transmission surface 4a on a conical surface, a frictional transmission surface 4b on a bottom surface of the cone, and a frictional transmission surface 4c on a circumferential surface of the cone axial line. Numeral 5 designates a shifting ring which is engaged in frictional engagement with the frictional transmission surface 4a of the planetary cone 4 and moved in the axial direction so as to vary the frictional transmission radius of the planetary cone 4, and numeral 6 an orbit ring which is engaged in frictional engagement with the frictional transmission surface 4c of the planetary cone 4 and, in its non-rotation state, guides the revolution of the planetary cone 4 around the axis of the input shaft 1. Numeral 7 designates an accessory drive pulley, numeral 7a a plurality of key grooves on the inner circumferential surface of the pulley 7 in the axial direction, and numeral 8 a roller key which transmits the rotational force of the shifting ring 5 to the pulley 7 and suppresses the movement in the axial direction and is engaged with the groove 7a. Numerals 9, 10 designate side plates to support the pulley 7 at both ends. Numeral 11 designates a stationary plate which fixedly supports the orbit ring 6 and is fixed at a mounting part 11a to the stationary member of the engine (not shown). Numeral 12 designates a frictional transmission oil which acts as a medium for the frictional transmission and is filled in the space enclosed by the pulley 7, the side plates 9, 10 and the input shaft 1 and sealed by oil seals 13, 14, 15. Numeral 16 designates a centrifugal governor comprising a centrifugal weight 16a and a spring plate 16b which supports the centrifugal weight and connects it to the shifting ring 5, and numeral 17 a return spring.

Operation of the accessory drive device will be described. The rotational force of the crank shaft of the engine is transmitted to the input shaft 1, and then to the input transmission member 2 through the cam device 3. The planetary cone 4 performs the self-rotation on its own axis, and at the same time performs the revolution around the axis of the input shaft 1 along the frictional transmission surface of the orbit ring 6 which is stationary. The shifting ring 5 engaged in frictional engagement with the frictional transmission surface 4a of the planetary cone 4 is rotated around the axis of the input shaft 1 on the basis of the differential action between the self-rotation and the revolution of the planetary cone 4 and the transmission radius ratio, and drives the pulley 7 through the roller key 8. The rotational speed ratio between the input shaft 1 and the gear shifting ring 5 can be arbitrarily set by moving the shifting ring 5 in the axial direction so that the effective radius ratio of the frictional transmission between the input shaft 1 and the shifting ring 5 is varied. For example, if the shifting ring 5 is engaged in frictional engagement at the large diameter side of the planetary cam 4, the rotational speed ratio becomes 1:1, and at the small diameter side, i.e., near vertex of the cone, the rotational speed ratio becomes 1:0.4; thus reduction at the shifting ring 5 can be selected in nonstage state. The centrifugal governor 16 controls the axial position of the shifting ring 5, and automatically controls the rotational speed of the pulley 7 to the speed ratio 1:1 at the low speed state of the engine and to the nearly constant rotational speed when the engine is at an intermediate or high speed state. The frictional transmission oil 12 is interposed on the frictional transmission surface and acts as medium for the frictional transmission force and performs lubrication and cooling of the contacting surface and the bearing.

In the accessory drive device utilizing the continuously variable transmission with the planetary mechanism of frictional transmission type as above described, the frictional transmission oil is infused in the device and a small number of air bubbles may be expanded by heating during the running and generate a high pressure within the enclosed space. In this case, since any of the oil seals 13, 14, 15 cannot endure the high pressure and oil leakage may occur, a special seal high withstanding pressure must be used. As a result, the device becomes of large size and high cost, and the seal of high withstanding pressure usually produces large sliding loss and may deteriorate the transmission efficiency of the device.

An object of the invention is to provide an accessory drive device wherein a even if the frictional transmission oil and bubbles are expanded by heating during running, pressure within the device can be automatically adjusted so that it does not rise.

SUMMARY OF THE INVENTION

An accessory drive device of an engine according to the invention is provided with a pressure adjusting device leading to a friction transmission oil infusion chamber of a continuously variable transmission with differential planetary mechanism of frictional transmission type interposed in a transmission system from an input shaft up to an accessory drive pulley. The pressure adjusting device communicates to the atmosphere through bleed holes and contains the frictional transmission oil in the inside, the maximum liquid level thereof being set at least higher than the top end of the frictional transmission oil infusion chamber.

Since the pressure adjusting device having the small holes leading to the atmosphere in above-mentioned construction holds the liquid level higher than the top end of the frictional transmission oil infusion chamber at the side of a stationary member, the bubble pressure escapes to the atmosphere and the pressure caused by the thermal expansion of the frictional transmission oil is absorbed by the volume of the pressure adjusting device, thereby increase in the pressure in the infusion chamber is automatically suppressed.

In one aspect of the invention, the pressure adjusting device is formed in a container with the suitable number of bleed holes, and the container communicates to the infusion chamber through a pipe at position lower than the liquid level of the frictional transmission oil contained in the container.

In another aspect of the invention, the pressure adjusting device includes a dish- or cup-shaped member fixed to a stationary plate supporting an input shaft, and a chamber formed between the above-mentioned member, the stationary member being connected to the infusion chamber through a communicating hole formed on the stationary plate.

DETAILED DESCRIPTION OF THE PREFERRED EMBODIMENTS

An embodiment of the invention will now be described referring to the accompanying drawings.

Figure 1:
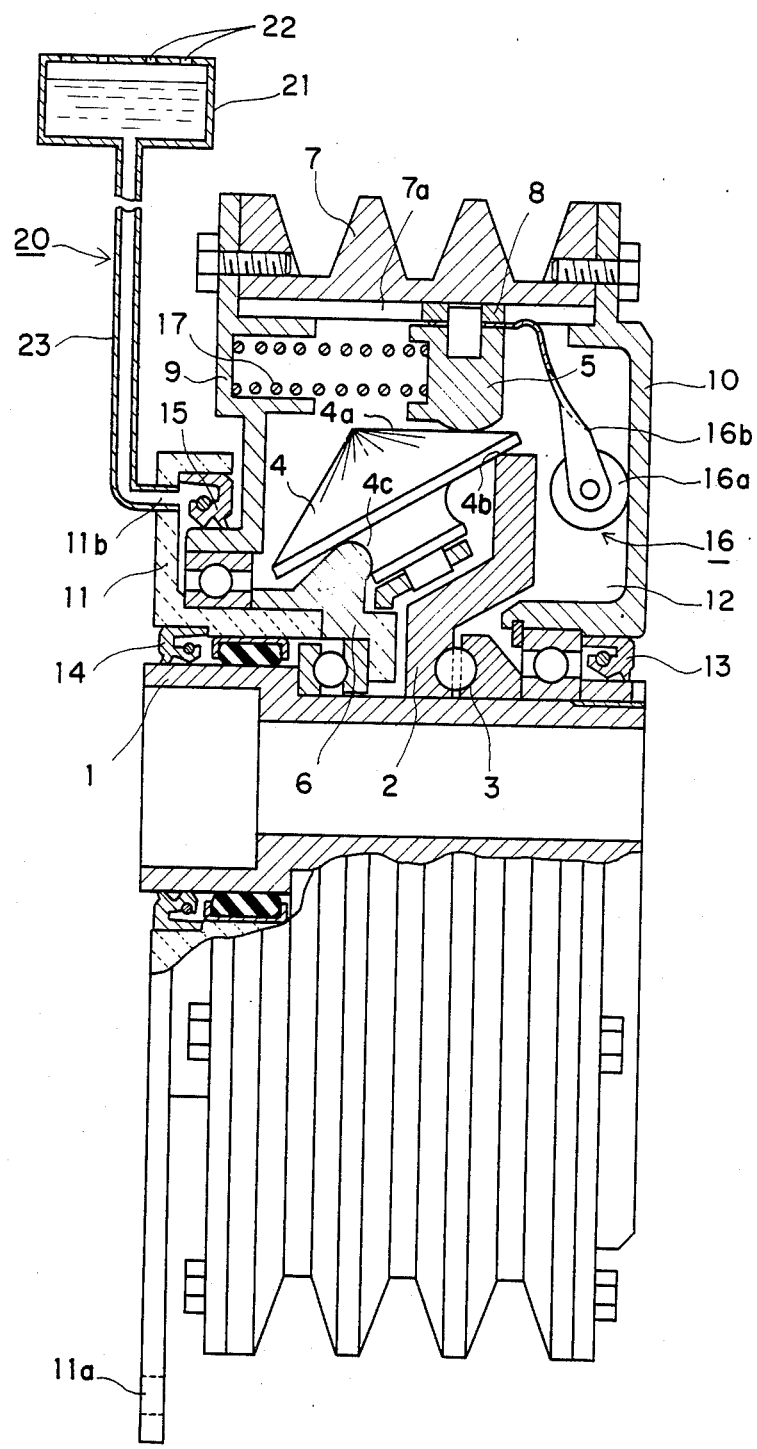
FIG. 1 is a side view of an accessory drive device of an engine according to the invention, partly cut away to reveal the inside thereof.
Figure 3:
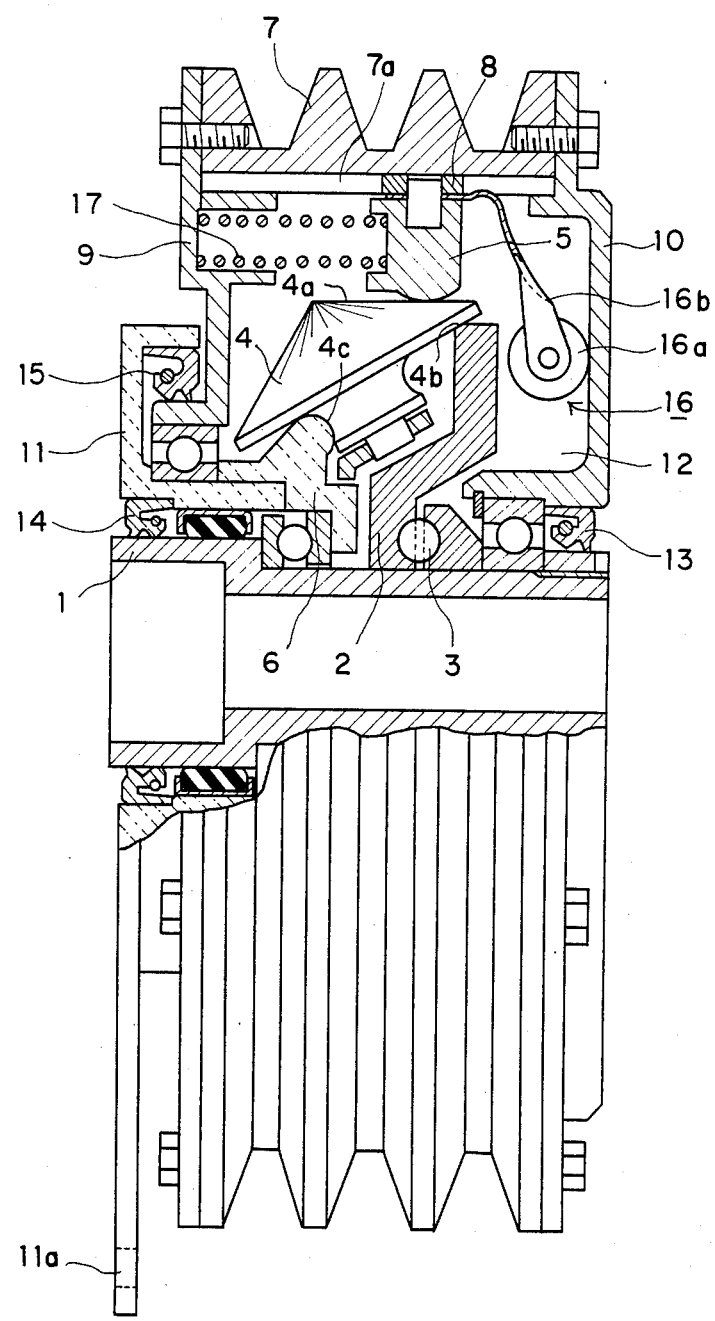
FIG. 3 is a side view, partly cut away, of an accessory drive device of an engine in the prior art.

In FIG. 1, reference numeral 1 designates an input shaft, numeral 2 an input transmission member on the input shaft, and numeral 3 a cam device for generating pressure interposed between the input shaft 1 and the input transmission member 2. Numeral 4 designates a plurality of planetary cones, each composed of a frictional transmission surface 4a on a conical surface, a frictional transmission surface 4b on a bottom surface of each cone, and a frictional transmission surface 4c on a circumferential surface of the cone axial center. Numeral 5 designates a shifting ring which is engaged in frictional engagement with the frictional transmission surface 4a of the planetary cone 4 and can move in the axial direction so as to vary the frictional transmission ratio, and numeral 6 an orbit ring which guides the revolution of the planetary cone 4 around the axial line of the input shaft 1. Numeral 7 designates an accessory drive pulley, numeral 7a a plurality of key grooves on the inner circumferential surface of the pulley 7 in the axial direction, and numeral 8 a roller key which transmits the rotational force of the shifting ring 5 to the pulley 7 by engagement with the key grooves 7a. Numeral 11 designates a stationary plate which is fixed at a mounting part 11a to the stationary member of the engine (not shown). Numeral 12 designates a chamber filled with a frictional transmission oil acting as medium for the frictional transmission, numerals 13, 14, 15 oil seals to seal the chamber 12 in the liquid tight manner, numeral 16 a centrifugal governor comprising a centrifugal weight 16a and a spring plate 16b, and numeral 17 a return spring. The construction and function of these elements are shown in FIG. 3 and are substantially the same as those used in the device of the prior art shown in FIG. 3 and already described, and the detailed description shall be omitted here.

A pressure adjusting device designated by numeral 20 includes a container or a tank 21 in a cylindrical shape, for example. The tank 21 which has a plurality of bleed holes 22 on the top wall thereof, communicates at the bottom wall through a pipe 23 and a communication hole 11b provided in the stationary plate 11 to the chamber 12. The tank 21 is installed so that the level of the bottom wall is higher than that of any part disposed at the highest position of the chamber 12.

Figure 2:
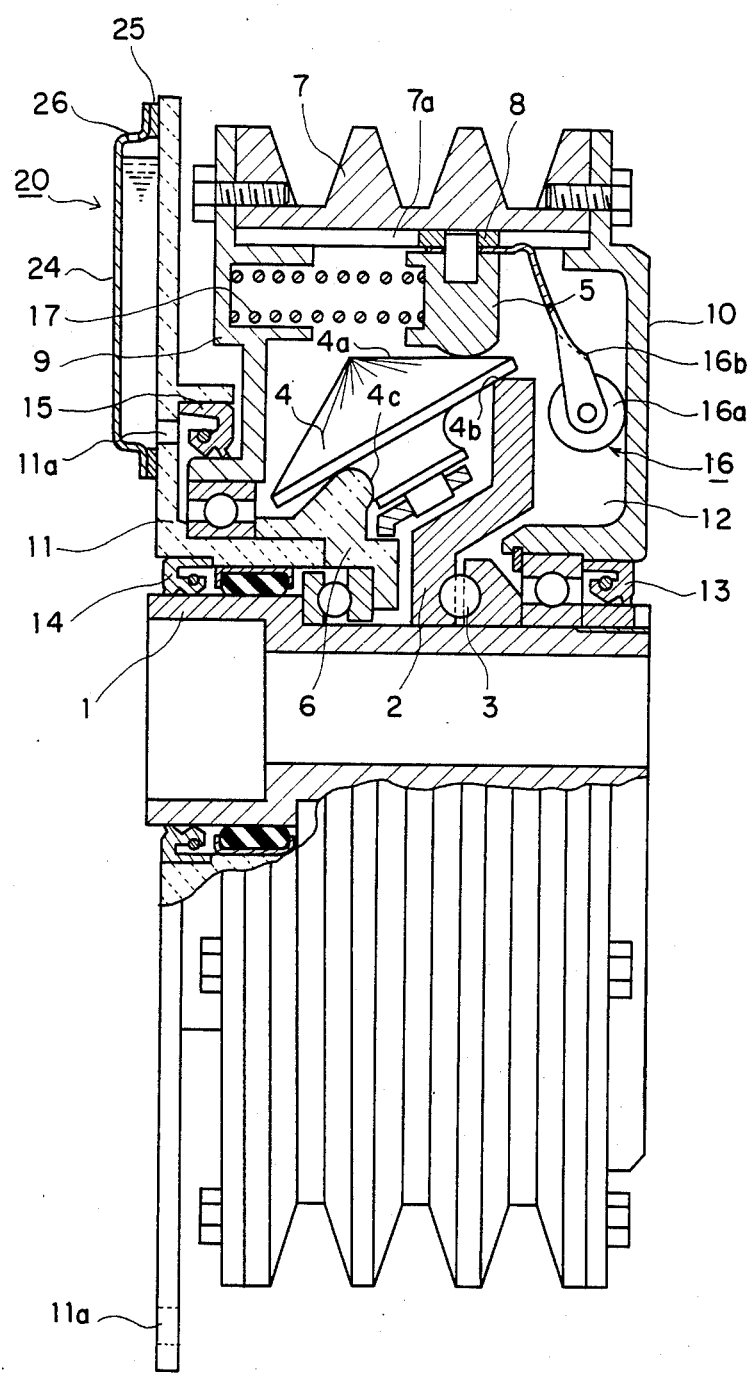
FIG. 2 is a side view of another accessory drive device of an engine according to the invention, partly cut away to reveal the inside thereof.

Otherwise, as shown in FIG. 2, a pressure adjusting device 20 includes a dish- or cup-shaped wall member 24 which is firmly fixed to a side surface of the stationary plate 11 through a packing 25, thereby forming a chamber to enclose the frictional transmission oil. This chamber has the top end higher than that of the chamber 12, and communicates to the atmosphere through bleed holes 26 formed on the member 24 and also to a chamber 12 through the communicating hole 11a.

In above-mentioned construction, even if the frictional transmission oil and a small number of bubbles contained in the oil are expanded by heat during the running state, the pressure adjusting device 20 absorbs the volume variation through the communication hole 11a or 11b, thereby the pressure of the frictional transmission oil in the chamber 12 is maintained substantially at atmospheric pressure. On the other hand, in the non-running state of the device, the frictional transmission oil is returned from the pressure adjusting device 20 to the chamber 12 so that liquid level in the pressure adjusting device 20 and that in the chamber 12 are in equilibrium to each other, thereby the original equilibrium is held.

According to the invention as above described, the pressure adjusting device having bleed holes is connected to the frictional transmission oil chamber of the accessory drive device utilizing the continuously variable transmission with planetary mechanism of frictional transmission type, so that the liquid level is kept higher than that of the chamber. As a result, even if the frictional transmission oil and bubbles are expanded by heat during running, the pressure in the chamber is kept constant, thereby an oil seal of high withstanding pressure requiring high cost and large size is not needed. Also, the sliding loss of the oil seal is decreased and therefore the transmission efficiency of the accessory drive device becomes high.

What is claimed is:

1. A device which drives accessories such as an alternator, a cooling water pump, an air-conditioning compressor or the like, utilizing power taken from an output shaft of an engine, said device comprising:

an input shaft rotatably supported on a stationary plate and receiving output from said output shaft and rotated at a rotational speed corresponding to that of said output shaft;

a transmission output member rotatably supported on said input shaft for transmitting the power to said accessories;

a planetary cone which can rotate on said input shaft in revolution around the axis of the input shaft and in self-rotation about an axis inclined with respect to said axis of the input shaft, said planetary cone having a first part of nearly conical shape, and a second part of nearly cylindrical shape leading to a bottom surface of the first part, and first, second and third frictional transmission surfaces being formed on the conical surface of the first part, the bottom periphery of the first part and the circumferential surface of the second part, respectively;

an input transmission member installed rotatable with said input shaft and engaged at its outer periphery in frictional engagement with the second frictional transmission surface of said planetary cone;

a support shaft of nearly cylindrical shape having a center hole through which said input shaft passes and arranged in coaxial relation to said input shaft and supporting rotatably with respect to said stationary plate said transmission output member;

an orbit ring fixedly supported to said support shaft, said orbit ring extending along the revolution path of said planetary cone and having an annular frictional engaging surface engaged in frictional engagement with the third frictional transmission surface of said planetary cone;

a shifting ring supported on said transmission output member and movable only in the axial direction thereof and having a frictional engaging surface engaged in frictional engagement with the first frictional transmission surface of said planetary cone always within the movable region in the axial direction;

a transmission ratio varying member for varying the position of said shifting ring in a direction toward or away from the rotation center of said planetary cone using the rotational speed of said transmission output member as a parameter and suppressing the rise of the rotational speed of said transmission output member when the rotational speed of said transmission output member because larger than a prescribed value;

said transmission output member having two end plate members positioned on both ends thereof, said end plate members together with said input shaft constituting an enclosed annular infusion chamber filled with an amount of frictional transmission oil; and a pressure adjusting device for adjusting the pressure of the frictional transmission oil in said infusion chamber, said pressure adjusting device including a second chamber and having bleed holes for connecting said pressure adjusting device to the atmosphere, said second chamber being connected in communication with said infusion chamber, the level of the top of said second chamber being higher than that of the top of said infusion chamber so that the level of the oil in said second chamber is held higher than the top end of said infusion chamber.

2. A device as set forth in claim 1, wherein said pressure adjusting device comprises said second chamber and a pipe connecting said pressure adjusting device to the infusion chamber.

3. A device as set forth in claim 1, wherein said pressure adjusting device comprises a dish- or cup-shaped member installed on the stationary plate, and said second chamber is formed between the stationary plate and said member.

4. A device as set forth in claim 2, wherein the infusion chamber and said second chamber are connected to each other through a communicating hole formed in the stationary plate.

5. A device as set forth in claim 3 wherein the infusion chamber and said second chamber are connected to each other through a communicating hole formed in the stationary plate.

* * * * *

UNITED STATES PATENT AND TRADEMARK OFFICE
CERTIFICATE OF CORRECTION

PATENT NO. : 4,685,355
DATED : August 11, 1987
INVENTOR(S) : Kazutoshi Kaneyuki

It is certified that error appears in the above-identified patent and that said Letters Patent is hereby corrected as shown below:

Column 2, line 46, delete the word "a" and insert a comma --,-- after the word "wherein".

Signed and Sealed this

First Day of December, 1987

Attest:

DONALD J. QUIGG

Attesting Officer

Commissioner of Patents and Trademarks